June 21, 1949.  H. D. CRANDON  2,474,035
METHOD AND APPARATUS FOR MAKING CONTAINERS
Filed Dec. 26, 1944
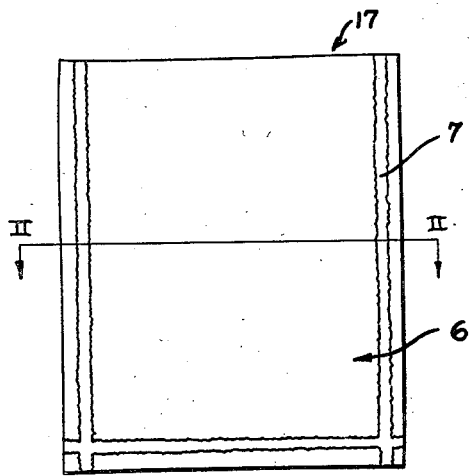
Fig.I
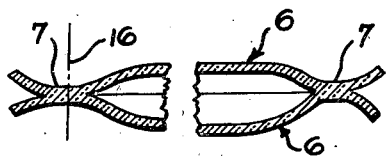
Fig.II
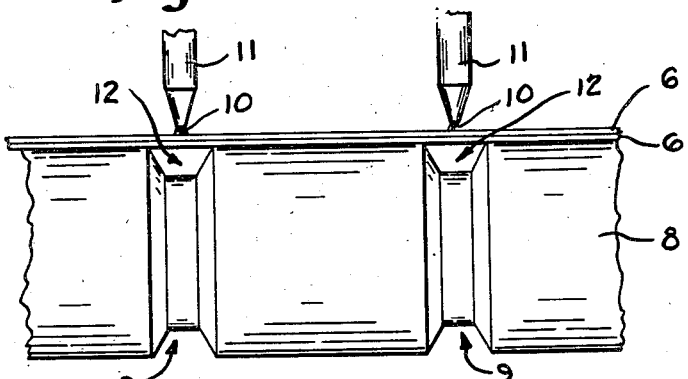
Fig.III
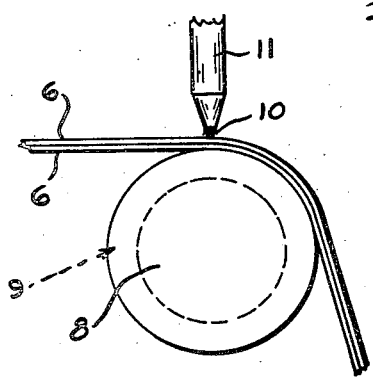
Fig.IV
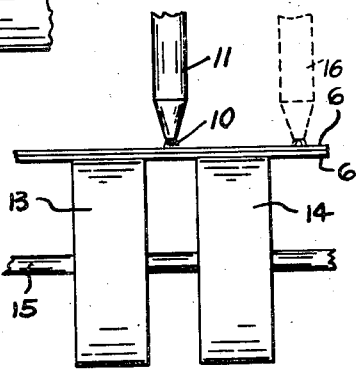
Fig.V
INVENTOR.
HARRY D. CRANDON
BY
*Louis L. Gagnon*
ATTORNEY Patented June 21, 1949

2,474,035

UNITED STATES PATENT OFFICE 2,474,035

METHOD AND APPARATUS FOR MAKING CONTAINERS

Harry D. Crandon, Woodstock, Conn., assignor to American Optical Company, Southbridge, Mass., a voluntary association of Massachusetts Application December 26, 1944, Serial No. 569,904

6 Claims. (Cl. 154—116)

This invention relates to containers and more particularly to sealed containers and method of making the same.

One of the principal objects of the invention is to provide a bag-type container and relates more particularly to novel means and method of sealing the contour edges of the superimposed layers of thin thermoplastic sheeting from which said containers are formed.

Another object is to provide a novel method of heat-joining the contour edges of relatively thin thermoplastic sheeting to form a bag-like container whereby an integral fused seam will be formed with substantially no heat being conducted away from the heated seam during the forming thereof.

Another object is to provide novel means and method of forming fused seams of the above character whereby a more uniform and rapid fusion of the material may be obtained whereby danger of overheating the support or supports for the sheeting during the heating operation and sticking of the hot plastic to said support or supports is eliminated.

Another object is to provide novel means and method of forming fused seams of the above character whereby the temperature required in forming such seams may be greatly reduced.

Another object is to provide novel means and method of forming fused seams of the above character whereby the time required in forming such seams is greatly reduced and a more positive bond is obtained.

Other objects and advantages of the invention will become apparent from the following description taken in connection with the accompanying drawings and it will be apparent that many changes may be made in the details of construction, arrangement of parts and steps of the method shown and described without departing from the spirit of the invention as expressed in the accompanying claims. I, therefore, do not wish to be limited to the exact details of construction, arrangement of parts and methods shown, as the preferred forms only have been given by way of illustration.

The invention is directed particularly to forming protective bag-like containers which may be hermetically sealed after the contents are placed therein so as to protect the contents against moisture, formation of fungus and general atmospheric conditions and more particularly to accomplish this result in a simple, efficient and economical manner.

Referring to the drawings:

Fig. I is a side elevational view of one type of container embodying the invention;

Fig. II is an enlarged fragmentary view of the container as taken on line 2—2 of Fig. I;

Fig. III is a fragmentary side elevational view of one form of support and related means for producing the fused seams and illustrating one of the essential features of the invention;

Fig. IV is an end view of the related parts of Fig. III; and

Fig. V is a view generally similar to Fig. III of a modified form of the invention.

Referring more particularly to the drawings wherein like characters of reference designate like parts throughout the several views, the container shown by way of illustration in the drawings comprises two superimposed sheets of relatively thin thermoplastic material 6 heat-joined with each other adjacent the contour edges of said sheets as illustrated at 7. It is particularly pointed out that the said heat-joining, as shown in Fig. I, is initially only throughout three sides of the superimposed sheets. This heat-joining, as shown in Fig. III, is preferably accomplished by supporting the superimposed sheets 6 on a roll 8 having a plurality of spaced circumferential grooves 9 formed therein. The width of the grooves 9 is controlled according to the width of the fused seam 7 which is to be formed and can be of any desired width. It is particularly pointed out that the width is to be such that no heat will be conducted from the superimposed sheets 6 at the location of which the fused seam is to be formed. The seam is formed by a hot gas 10 which is directed through suitable jets 11 onto the sheeting directly above the circumferential grooves 9. The seams 7 are formed by moving the superimposed sheets 6 beneath the jets 11 by imparting a rotary movement to the roll 8. The movement of the roll 8 is preferably at a continuous rate of speed depending upon the heat to which the sheets are subjected and the thickness of the sheets 6. It has been found that with superimposed sheets 6 of vinyl compositon substantially four-thousandths of an inch thick and with gas heated to substantially 265° C. it is possible to form fused seams at the rate of substantially one yard a minute with the seams being one-quarter of an inch in width.

It is particularly pointed out that any desirable sheeting such as vinyl, nylon, materials known commercially as Saran and Koroseal, butyrate, or any other known thermoplastic material may be used. Such materials are of interest as they will stretch and will readily conform to different shapes.

It is particularly pointed out that one of the essential features of the invention is that of supporting the superimposed sheets 6 so that there is an air space 12 beneath the jets 11.

As stated above this may be accomplished by forming circumferential grooves 9 in the roll 8 or may be accomplished through the use of spaced rolls 13 and 14 as illustrated in Fig. V. In this instance the rolls 13 and 14 are supported by the shaft 15 which may be rotated at any desired substantially constant speed.

The seam 7, as shown in Fig. II, results from the fusing of the materials of the sheets 6 with each other so that the sheets are integrally bonded throughout the seam.

The grooves 9 are spaced according to the size of the container to be formed and may be located in any desired spaced relation with each other.

The seam 7 may be formed wide enough so as to permit splitting the seam between the outer edges thereof thereby causing the immediate contour edges of the resultant container to be integrally joined with each other. The split in this instance would be substantially along the line 16 as shown diagrammatically in Fig. II.

In completing the container the contents would be placed within the container through the open end 17. Air would then be exhausted from the container and the open end 17 would then be sealed in a manner similar to that described above thereby hermetically sealing the contents within the container.

Such containers are of particular value in protecting the contents against atmospheric conditions as the contents may remain in the container until their immediate use is required and are of particular value in protecting articles which are susceptible to the formation of fungus particularly which results from exposing articles, for example, formed partially of leather, rubber or other materials which will deteriorate when subjected to salt air, high humidity or other fungus forming conditions.

It has been found in the past that several prior art containers, particularly in high altitudes have a tendency to expand and burst. Due to the fact that all air is exhausted from the present containers at the time of hermetically sealing the articles or contents therein, this danger of having the container burst at high altitudes is completely eliminated.

The hot gas referred to above is preferably hot air but may be nitrogen or carbon dioxide or other non-inflammable gas.

It has been found that the above method enables the forming of fused seams of the character described at a much greater rate of speed than known prior art methods and avoids the danger of having the heat-joined portions of the material sticking or adhering to the support and thereby accomplishes the desired results in a much more simple and efficient manner.

It is to be understood that the speed at which the sheetings 6 travel beneath the jets 11 depends upon the temperature of the hot gas employed so that if a high temperature is used, the speed of travel can be increased accordingly. Care is exercised, however, that the temperature is below the point which will cause the material to scorch or become distorted. The essential factor is that the heat and speed of travel be sufficient to bring about an integral fused bond of the material of the sheetings along the seam 7.

The integral bond is further insured by a slight pressure created by the hot air ejected by the jets 11 and must be controlled, therefore, in order to insure the proper fusion without unduly distorting the materials throughout the seam.

It is to be understood that several different modifications for obtaining the air space 12 beneath the sheeting might be employed. For example, the edges of the sheeting 6 might extend beyond the outer edges of the rolls 13 and 14 and said edges subjected to hot air by means of a jet 16 to bring about an integral bond at said location.

All of the above arrangements are within the scope of the present invention, it being mainly essential to provide an air space beneath the sheetings in the immediate vicinity of the portions of the sheets which are subjected to the hot air for sealing.

From the foregoing description it will be seen that simple, efficient and economical means have been provided for accomplishing all of the objects and advantages of the invention.

Having described my invention, I claim:

1. The method of forming a fused seam between thin sheets of thermoplastic material comprising the steps of assembling the sheets in superimposed relation, positioning the superimposed sheets on support means having an air-recess in alignment with the desired location for the seam, providing jet means on the opposed side of the superimposed sheets and spaced therefrom, directing heated non-inflammable gases through the jet means onto the adjacent sheet at said location, said gases having a temperature sufficient to cause the portions of the superimposed sheets at said location to be heated to a fusible state, and controlling the pressure at which the gases are directed onto said sheet to avoid substantially distorting the sheets and to bring about an integral bonding of the heated portions, the air-recess of the support means extending transversely beyond the limits of the heated portions of the sheets a sufficient amount to prevent conductance of heat to the support means.

2. The method forming a fused seam between thin sheets of thermoplastic material comprising the steps of assembling the sheets in superimposed relation, positioning the superimposed sheets on support means having an air-recess in alignment with the desired location for the seam, providing jet means on the opposed side of the superimposed sheets and spaced therefrom, moving said superimposed sheets across the support means, directing heated non-inflammable gases through the jet means onto the adjacent sheet at said location, controlling the temperature of said gases so as to cause the superimposed sheets to be heated at said location to a fusible state, and controlling the pressure at which the gases are directed onto said moving sheets to avoid substantially distorting the sheets and to bring about an integral bonding of the heated portions, the air-recess of the support means extending transversely beyond the side limits of the heated portions of the sheets a sufficient amount to prevent sticking the moving sheets to the support means by conductance of heat thereto.

3. The method of forming a fused seam between thin sheets of thermoplastic material comprising the steps of assembling the sheets in superimposed relation, positioning the superimposed sheets on support means having an air-recess in alignment with the desired location for the seam, providing jet means on the opposed side of the superimposed sheets adjacent said location and spaced therefrom, directing heated air through the jet means onto the adjacent sheet at said location, controlling the temperature of said heated air so as to be sufficient to cause the superimposed sheets to be heated at said location to a fusible state, and controlling the pressure at which the heated air is directed onto said sheet to avoid distorting the sheets and to bring about an integral bonding of the heated portions, the air-recess of the support means extending transversely beyond the limits of the heated portions of the sheets a sufficient amount to prevent conductance of heat to the support means.

4. The method of forming a fused seam between a pair of thin sheets of thermoplastic material comprising the steps of assembling the sheets in superimposed relation, positioning one of the superimposed sheets on support means having an air-recess in alignment with the desired location for the seam and exposing the outer surface of the other sheet to the air, providing jet means on said air exposed surface of the other superimposed sheet and spaced from said surface, directing heated non-inflammable gases through the jet means onto the adjacent surface of said sheet at said location, controlling the temperature of said gases sufficiently to cause the superimposed sheets to be heated at said location to a fusible state, and controlling the pressure at which the gases are directed onto said sheets to avoid substantially distorting the sheets and to bring about an integral bonding of the heated portions, the air-recess of the support means extending transversely beyond the limits of the heated portions of the sheets a sufficient amount to prevent conductance of heat to the support means.

5. A device for use in forming articles of thermoplastic material, said device comprising a supporting member having a substantially smooth contoured surface for supporting one side of a plurality of superimposed thin sheets of thermoplastic material, said surface having a recessed portion therein, jet means having its mouth portion directed toward and spaced from said recessed portions and in substantial alignment therewith, said jet means being adapted to be connected with and to eject a heated non-inflammable gas onto the portions of the superimposed sheets when supported intermediate said jet means and the recessed portions, and said recessed portions being of a width greater than and extending beyond the limits, on either side thereof, of the area of the portions of the sheets heatable by said gas to prevent conductance of heat by the support member.

6. In a device for use in forming articles of thermoplastic material, said device comprising a rotatable member having a cylindrically shaped substantially smooth surface for supporting one side of a plurality of superimposed thin sheets of thermoplastic material, said surface having a recessed portion therein, and jet means having its mouth portion directed toward and spaced from said rotatable member and in substantial alignment with the recessed portions thereof, said jet means being adapted to be connected with and to eject a heated non-inflammable gas onto the portions of the superimposed sheets when supported intermediate the jet means and the recessed portions of the rotatable member, and said recessed portions being of a width greater than and extending beyond the limits, on either side thereof, of the portions of the sheets heatable by said gases to prevent conductance of heat by the rotatable member.

HARRY D. CRANDON.

REFERENCES CITED

The following references are of record in the file of this patent:

UNITED STATES PATENTS

| Number | Name | Date |
| --- | --- | --- |
| 2,114,625 | Bergstein | Apr. 19, 1938 |
| 2,140,117 | Salfisberg | Dec. 13, 1938 |
| 2,283,069 | Kneutter | May 12, 1942 |
| 2,344,369 | Salfisberg | Mar. 14, 1944 |
| 2,367,725 | Lindh et al. | Jan. 23, 1945 |